United States Patent
Rosenberg

(10) Patent No.: US 7,429,108 B2
(45) Date of Patent: Sep. 30, 2008

(54) GAZE-RESPONSIVE INTERFACE TO ENHANCE ON-SCREEN USER READING TASKS

(75) Inventor: Louis B. Rosenberg, Pismo Beach, CA (US)

(73) Assignee: Outland Research, LLC, Pismo Beach, CA (US)

( * ) Notice: Subject to any disclaimer, the term of this patent is extended or adjusted under 35 U.S.C. 154(b) by 74 days.

(21) Appl. No.: 11/466,374

(22) Filed: Aug. 22, 2006

(65) Prior Publication Data
US 2006/0256083 A1    Nov. 16, 2006

Related U.S. Application Data

(60) Provisional application No. 60/733,416, filed on Nov. 5, 2005.

(51) Int. Cl.
*A61B 3/14* (2006.01)
(52) U.S. Cl. .............................. 351/209; 382/103
(58) Field of Classification Search ................ 351/209; 382/103
See application file for complete search history.

(56) References Cited

U.S. PATENT DOCUMENTS

| 2,724,305 | A | * | 11/1955 | Brandt ..................... 351/210 |
|---|---|---|---|---|
| 4,075,657 | A | | 2/1978 | Weinblatt |
| 4,091,302 | A | | 5/1978 | Yamashita |
| 4,827,520 | A | | 5/1989 | Zinstra |
| 5,005,203 | A | | 4/1991 | Ney |
| 5,036,539 | A | | 7/1991 | Wrench, Jr. et al. |
| 5,751,260 | A | | 5/1998 | Nappi et al. |
| 5,835,616 | A | | 11/1998 | Lobo et al. |
| 5,861,940 | A | | 1/1999 | Robinson et al. |
| 6,108,437 | A | | 8/2000 | Lin |
| 6,243,076 | B1 | | 6/2001 | Hatfield |
| 6,244,742 | B1 | | 6/2001 | Yamada |
| 6,442,573 | B1 | | 8/2002 | Schiller et al. |
| 6,493,734 | B1 | | 12/2002 | Sachs et al. |

(Continued)

OTHER PUBLICATIONS

Rosenberg, Louis B., "U.S. Appl. No. 11/465,777", (Aug. 18, 2006).

(Continued)

*Primary Examiner*—Ricky Mack
*Assistant Examiner*—James R Greece
(74) *Attorney, Agent, or Firm*—Thomas F. Lebens; Sinsheimer Juhnke Lebens & McIvor, LLP

(57) ABSTRACT

A system, method, and computer program product for automatically providing reading place-markers to a user reading a textual document upon an electronic display. A gaze-tracking element monitors a user's gaze while he or she reads the textual document and determines a look-away event. In response to a look-away event, the system automatically provides a reading place-marker by accentuating an area at or near where the user looked away from the text. In this way the user may more easily return to the location at which he or she ceased reading. In some embodiments the place-marker is automatically removed upon determination that the user's gaze has returned to the marked location within the text. In some such embodiments the reading-place marker is removed in response to the user resuming a characteristic reading gaze motion at or near the marked location. In this way the marker is removed when no longer needed.

25 Claims, 8 Drawing Sheets

U.S. PATENT DOCUMENTS

| | | |
|---|---|---|
| 6,513,006 B2 | 1/2003 | Howard et al. |
| 6,535,139 B1 | 3/2003 | Lindler |
| 6,535,854 B2 | 3/2003 | Buchner |
| 6,760,703 B2 | 7/2004 | Kagoshima et al. |
| 6,804,643 B1 | 10/2004 | Kiss |
| 6,811,492 B1 | 11/2004 | Arakawa et al. |
| 6,853,739 B2 | 2/2005 | Kyle |
| 6,858,970 B2 | 2/2005 | Malkin |
| 6,863,220 B2 | 3/2005 | Selker |
| 6,873,314 B1 * | 3/2005 | Campbell .................. 345/156 |
| 6,885,362 B2 | 4/2005 | Suomela |
| 6,982,697 B2 | 1/2006 | Wilson |
| 2001/0041053 A1 | 11/2001 | Abecassis |
| 2002/0126150 A1 | 9/2002 | Parry |
| 2002/0180799 A1 | 12/2002 | Peck et al. |
| 2003/0038754 A1 * | 2/2003 | Goldstein et al. ............. 345/7 |
| 2003/0069077 A1 | 4/2003 | Korienek |
| 2004/0075645 A1 | 4/2004 | Taylor et al. |
| 2004/0124248 A1 | 7/2004 | Selker |
| 2004/0156020 A1 * | 8/2004 | Edwards .................. 351/209 |
| 2004/0166937 A1 | 8/2004 | Rothschild |
| 2004/0224638 A1 | 11/2004 | Fadell et al. |
| 2005/0012758 A1 | 1/2005 | Christou |
| 2005/0028190 A1 | 2/2005 | Rodriguez et al. |
| 2005/0047629 A1 | 3/2005 | Farrell et al. |
| 2005/0108092 A1 | 5/2005 | Campbell |
| 2005/0175218 A1 | 8/2005 | Vertegaal et al. |
| 2005/0212749 A1 | 9/2005 | Marvit et al. |
| 2006/0017692 A1 | 1/2006 | Wehrenberg et al. |

OTHER PUBLICATIONS

Rosenberg, Louis B., "U.S. Appl. No. 11/535,430", (Sep. 26, 2006).
Rosenberg, Louis B., "U.S. Appl. No. 11/535,423", (Sep. 26, 2006).
Rosenberg, Louis B., "U.S. Appl. No. 11/562,082", (Nov. 21, 2006).
Rosenberg, Louis B., "U.S. Appl. No. 11/267,079", (Nov. 3, 2005).
Zhai, Morimoto et al., "Manual and Gaze Input Cascaded (Magic) Pointing", Conference on Human Factors in Computing Systems; May 1999; pp. 2460253; ACM Press; New York, NY, USA,(May 1999),246-253.
Rosenberg, Louis B., "U.S. Appl. No. 11/271,172", (Nov. 10, 2005).
Miastkowski, Stan "How it Works: Speech Recognition", PC World, Apr. 14, 2000, pp. 1-5, (Apr. 14, 2000),1-5.
Rosenberg, Louis B., "U.S. Appl. No. 11/278,369", (Mar. 31, 2006).
Rosenberg, Louis B., "U.S. Appl. No. 11/381,504", (May 3, 2006).

* cited by examiner

FIG. 3A compared with the size of the rest of him, were waving helplessly before his eyes.

"What's happened to me?" he thought. It was no dream. His room, a regular human room, only a little on the small side lay quiet between the four familiar walls. Over the table, on [which] an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 3B compared with the size of the rest of him, were waving helplessly before his eyes.

"What's happened to me?" he thought. It was no dream. His room, a regular human room, only a little on the small side lay quiet between the four familiar walls. Over the table, on which [an] unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 3C compared with the size of the rest of him, were waving helplessly before his eyes.

"What's happened to me?" he thought. It was no dream. His room, a regular human room, only a little on the small side lay quiet between the four familiar walls. [Over the table, on which] an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 3D compared with the size of the rest of him, were waving helplessly before his eyes.

"What's happened to me?" he thought. It was no dream. His room, a regular human room, only a little on the small side, lay quiet between the four familiar walls. Over the table, on which an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 3E compared with the size of the rest of him, were waving helplessly before his eyes.

"What's happened to me?" he thought. It was no dream. His room, a regular human room, only a little on the small side, lay quiet between the four familiar walls. Over the table, on which an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 3F compared with the size of the rest of him, were waving helplessly before his eyes.

"What's happened to me?" he thought. It was no dream. His room, a regular human room, only a little on the small side, lay quiet between the four familiar walls. Over the table, on which an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 5A:

compared with the size of the rest of him, were waving helplessly before his eyes.

"What's happened to me?" he thought. It was no dream. His room, a regular human room, only a little on the small side lay quiet between the four familiar walls. Over the table, on which an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 5B compared with the size of the rest of him, were waving helplessly before his eyes.

"What's happened to me?" he thought. It was no dream. His room, a regular human room, only a little on the small side lay quiet between the four familiar walls. Over the table, on which an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

FIG. 5C compared with the size of the rest of him, were waving helplessly before his eyes.

"What's happened to me?" he thought. It was no dream. His room, a regular human room, only a little on the small side lay quiet between the four familiar walls. Over the table, on which an unpacked line of fabric samples was all spread out—Samsa was a traveling salesman—hung the picture which he had recently cut out of a glossy magazine and lodged in a pretty gilt frame. It showed a lady done up in a fur hat and a fur boa, sitting upright and raising up against the viewer a heavy fur muff in which her whole forearm had disappeared.

GAZE-RESPONSIVE INTERFACE TO ENHANCE ON-SCREEN USER READING TASKS

RELATED APPLICATION DATA

This application claims priority to provisional application Ser. No. 60/733,416, filed Nov. 5, 2005; this application is also related to application Ser. No. 11/381,504 filed May 3, 2006, and application Ser. No. 11/271,172 filed Nov. 10, 2005, the disclosures of which are hereby incorporated by reference as if fully set forth.

FIELD OF THE APPLICATION

The present application is directed generally toward gaze-tracking applications, and more specifically toward a gaze-tracking system for helping a user to find a lost place in a textual environment.

BACKGROUND

A variety of technologies exist for tracking the direction that a user gazes upon a computer screen, usually referred to as eye-tracking or gaze-tracking. Over the last few years, the hardware and software required to perform such functions has gotten less expensive, more robust, and has been enabled through progressively smaller and smaller embodiments. This trend is expected to continue to the point where gaze-tracking hardware and software may become standard equipment upon personal computers, laptops, PDA, and even cell phones. At the present time, the primary applications of gaze-tracking technology are directed at specialized tools for performing marketing research and other user studies as well as specialized tools for enabling persons with mobility disabilities to interact with computer systems. For example, many applications of gaze-tracking technologies are used to study how people visually explore the information presented on computer screens. These studies, usually performed by marketers and user-interface researchers are geared towards understanding which content on a computer display people spend their time looking at. This is because gaze-tracking technology can determine with a high degree of accuracy which pictures, words, menu items, or even pixels a user is looking at any given moment in time. In a quest to develop optimized web pages and computer driven advertisements, researchers use such gaze-tracking tools to quantify the effectiveness of certain layouts and presentations to grab user attention to desirable content. In the disability field, many applications of gaze-tracking technologies are used to enable individuals who have limited physical mobility to control a computer cursor and/or make other selections within a computer interface by using their eyes as the input control. The gaze-tracking technology determines where the user is looking at controls the cursor to follow their gaze. Often a blink is used to emulate the clicking of a mouse thereby enabling a user to have full cursor control using only their eyes as the input means. For example, a company called EyeTech Digital Systems produces such products for disabled users. Their technology is now small enough and low cost enough to be mounted directly upon a standard laptop and takes up little more physical space than would a standard web cam and a pair of speakers.

A variety of technologies exist for gaze-tracking. These technologies generally employ one or more digital camera aimed at the eyes of the user of a computer system. These technologies sometimes also employ a source of lights, sometimes structured light, such that the reflection of the light off the eyes can be captured by the digital camera and used to determine where on the display screen a user is looking at. For example, an eye tracking device has been developed by the IBM Corporation at its Almaden Research Center and is referred to by the acronym "MAGIC." This device is mounted proximate to a display screen, in a known positional relationship. When a user is viewing the screen, the IBM eye tracking device determines the point of gaze or focus, with respect to the screen, of the pupils of the user's eyes. Such device generally comprises a camera which acquires successive image frames at a specified rate, such as 30 frames per second. The device further comprises two near infrared time multiplexed light sources, each composed of a set of IR light emitting diodes (LED's) synchronized with the camera frame rate. The system tracks eye focus by detecting the reflection of the emitted light off the user's eyes. Such a process is described in more detail later in this document. One gaze-tracking system for enhancing the usability of portable computing devices that uses such an eye-tracking system is disclosed in pending U.S. Patent Application Publication No. 2003/0038754, entitled "Method and apparatus for gaze responsive text presentation in RSVP display," which is hereby incorporated by reference. Another gaze-tracking system is disclosed in pending U.S. Patent Publication No. 2002/0180799, entitled "Eye gaze control of dynamic information presentation," which is also hereby incorporated by reference. This system is directed at controlling the rate of scrolling of a text document based upon where the user is looking. Another gaze-tracking system that has been more recently developed is disclosed in pending U.S. Patent Application Publication No. 2004/0075645, entitled "Gaze tracking system," which is also hereby incorporated by reference. This system is advantageous over some prior art systems in that it only requires a single camera pointed at the user and does not require calibration and lighting control.

Widespread integration of eye trackers into consumer systems requires that eye trackers be easy to use, affordable, accurate, and less constrained by head and body movements of users. Another gaze-tracking system is disclosed in U.S. Patent Application Publication No. 2005/0175218, entitled "Method and apparatus for calibration-free eye tracking using multiple glints or surface reflections," which is hereby incorporated by reference. The aforementioned systems and other recent advances in gaze-tracking are expected to increase the robustness and decrease the size and cost of gaze-tracking systems available in consumer markets. As the current trends continues, gaze-tracking systems are expected to soon be commonly available on mainstream consumer products such as personal computers, laptops, PDAs, cell phones, and other devices that include display screens for presenting information to users. With the expected proliferation of gaze-tracking technologies within the user interfaces of mainstream consumer products, there will be substantial opportunities for gaze-responsive software tools that are intended to support more than esoteric research applications and/or very narrow disability populations.

Over recent years significant advances have been made in the design of user interfaces of computing systems enabling easier and more convenient interaction. Current systems are still deficient, however. A significant problem arises for computer users utilizing multi-tasking environments such as Windows where they are very often reading documents while simultaneously performing other functions such as searching for pictures, viewing video, talking with colleagues, or even simply reaching for a cup of coffee. In such situations users often look away from a text document they are reading to perform some other function and then must waste time rescanning a portion of the document to find their lost place. As people develop multi-tasking work habits, this problem of visually finding a lost place within a text document is becoming an increasing waste of time and effort for users. And as people perform more and more tasks on portable devices, they often must look away from documents they are reading to scan their local environment for they may be walking down the street with a PDA while reading the text document. Current systems are therefore deficient because they fail to help users to find their lost place in a textual document such that they can resume reading without needing to waste significant time re-scanning the text to find where they left off.

SUMMARY

At the present time, users of a wide variety of computing systems review textual documents upon electronic displays, reading the document directly from the display rather than from a paper printout. Very often users read a portion of the document and then affix their visual attention elsewhere for a period of time. This may be because the user has shifted his or her visual attention to another portion of the display screen, possibly because he or she is reviewing other documents, images, videos, or web pages in an alternate window of a multi-tasking operating system such as Windows. This may also be because the user has looked away from the screen altogether, to view a paper document, a different computer screen, a television display, to answer a phone, or just to momentarily grab a cup of coffee from across his or her desk.

Regardless of the reason, there are a great many instances during the daily activities of a typical computer user in which he or she reads a portion of a textual document upon an electronic display, looks away from the text document for a period time, and then returns his or her attention to the text document with the intention of continuing reading from the place he or she left off. Almost without exception, the user must expend some effort to find the place that he or she left off, re-reading a portion of the document. This is especially true if the interruption was an unplanned event such as an incoming telephone call that may interrupt a user's reading in the middle of a sentence. The effort required to find a user's place in a document he or she was reading after looking away, a process usually referred to as finding a lost place in the document, can be a significant waste of time and mental effort. Embodiments of the present invention address this problem by automatically providing users who read documents on electronic displays with a graphical place-marker that indicates where he or she most recently stopped reading within a textual document prior to looking away. In this way, the graphical-place marker of the present invention assists users in finding their place when returning their visual attention to a textual document that they had previously been reading. With this graphical assistance, the users of embodiments of the present invention can resume reading the target document quickly and easily, without needing to re-read text or otherwise search for their lost place.

Thus the present invention is directed to a method, system, and computer programming for deriving the location of and displaying a graphical place-marker upon or within a displayed textual document on an electronic display, where the graphical place-marker is of a form and location such that it is operative to assist a user in finding his or her place when returning his or her attention to the displayed document after looking away. More specifically, the present invention is directed to a method, system, and computer program that utilizes gaze-tracking hardware and software to automatically determine the location at which a graphical place-marker is to be displayed upon or within a displayed textual document on an electronic display, where the graphical place-marker indicates a location within the textual document that represents the user's most recent place within the document such that it can assist the user, after the user has glanced away from the document or otherwise shifted his or her visual attention elsewhere, in finding his or her place upon returning visual attention to the document with the intent of continuing to read from where he or she left off.

In some preferred embodiments of the present invention the graphical place-marker is displayed only when it is determined that a user has looked away from the electronically displayed textual document and/or skipped to a different location in the displayed textual document. This is performed by the gaze-tracking hardware and software that continually monitors the location of the user's gaze as he or she reads through the text, following word by word as his or her reading progresses. When it is determined that the user's gaze has abruptly left the text, the previous location in the text where the user's gaze had been tracked to during continuous reading is identified as the user's "last place" in the document. The graphical text marker is then drawn at, around, or otherwise indicating that "last place" within the document. For example, the last word read by the user before looking away may be highlighted, outlined, underlined, bolded, or otherwise accentuated. Alternately the word after the last word read may be highlighted, outlined, underlined, bolded, or otherwise accentuated, this word being the next word to be read by the user when he or she resumes reading. Alternatively the space between the last word read and the next word to be read is highlighted, outlined, underlined, bolded, or otherwise accentuated. Because the place marker is drawn only after the user looks away from a text, the place-marker does not distract the user while he or she engaged in continuous reading for it only appears when the user shifts his or her attention elsewhere. In this way the displayed place-marker is displayed and remains present when the user returns his or her visual attention to the document and for some period thereafter. The graphical place-marker thus assists the user in finding his or her previous place in the document. In some embodiments of the present invention, the gaze-tracking technology also determines when the user has returned his or her gaze and resumed reading of the text. Upon such a determination of "resumed reading", the methods of certain embodiments of the present invention automatically remove the graphical place-marker. In this way place-markers are eliminated when no longer needed by the user. If the user looks away again, a new place-marker is drawn.

In some embodiments of the present invention, place markers are provided continuously as a user reads through a document, indicating for example, the most recent line of text completely read by the user and/or indicating the current line of text currently being read by the user. For example, in one embodiment of the present invention the current line of text being read by the user is highlighted, outlined, underlined, bolded, or otherwise accentuated and remains that way until the user finishes reading that line. When the user gets to the next line in the text document, that next line is highlighted, outlined, underlined, bolded, or otherwise accentuated and remains that way until the user finishes reading that line. In this way the current line that the user is reading is identified with a continually updated graphical indication. If the user looks away at any time, the line that he or she is currently in the midst of reading, but has not yet completed, remains highlighted, outlined, underlined, bolded, or otherwise accentuated. In this way when the user returns his or her gaze to the document, he or she can easily find the most recent line of text that he or she was reading. This is not as specific as the embodiment previously described, for it identifies the most recent line and not the most recent word, but this is sometimes sufficient for a user. This alternate embodiment also has the additional benefit of assisting some users who may get tripped up while reading a line of text and need to re-read, for by being highlighted or otherwise accentuated, it is easier for the user to go back a few words in that line and re-read when tripped up.

Thus the present invention is a novel use of gaze-tracking technology to provide users with assistance in finding their previously place in an electronically displayed textual document when looking away in the midst of reading that document. The following figures and description provide additional details as to the methods, apparatus, and computer software instructions that enable certain embodiments of the present invention.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The above and other aspects, features and advantages of the present embodiments will be more apparent from the following more particular description thereof, presented in conjunction with the following drawings wherein:

FIGS. 3A-3F illustrate enlarged portions of text displayed upon screen according to at least one embodiment of the invention;

FIGS. 5A-5C illustrate example screens of a line-tracking method according to at least one embodiment of the invention;

Figure 1:
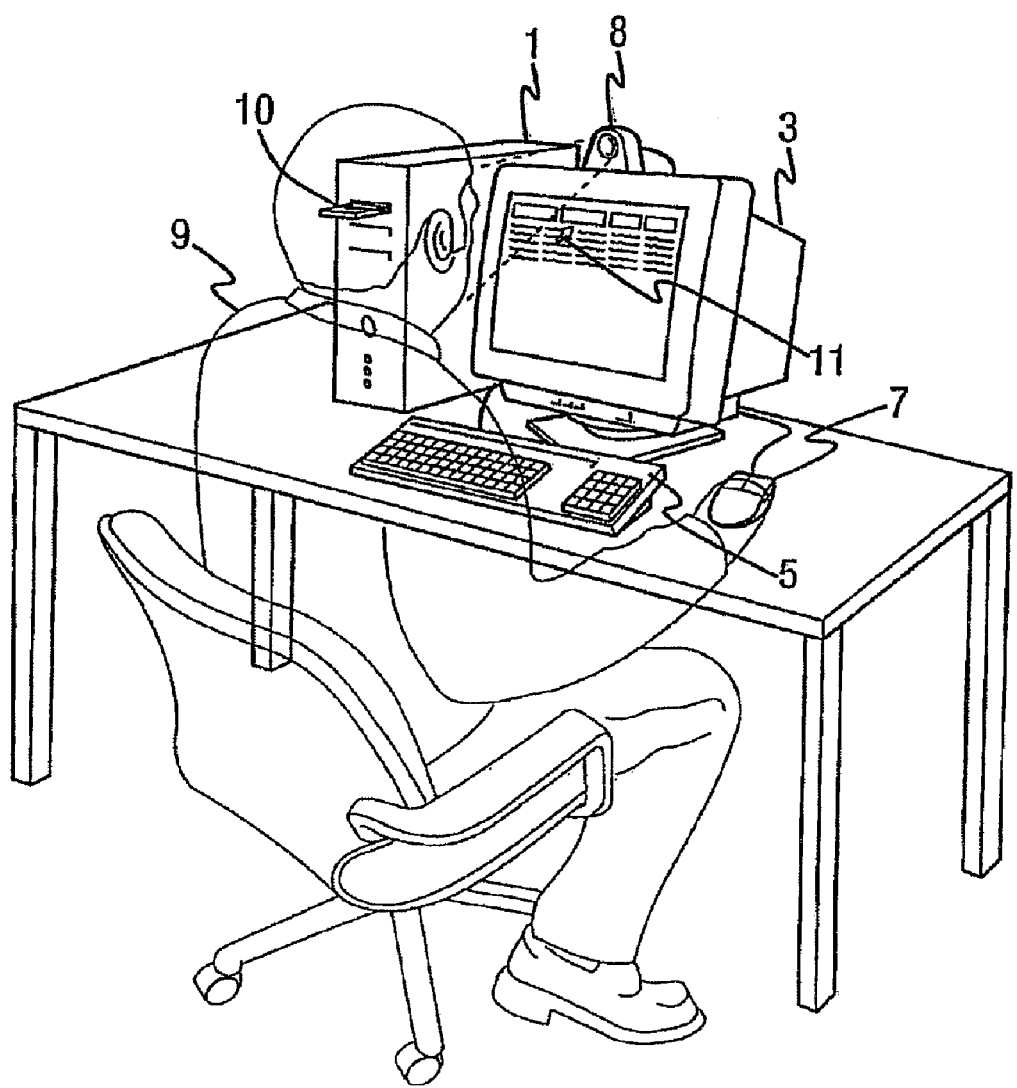
FIG. 1 illustrates a gaze-tracking system according to at least one embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

A variety of technologies exist for tracking the location at which a user is looking when visually attending to documents displayed upon an electronic screen. Often referred to as gaze-tracking or eye-tracking technology, the systems generally work by sensing the direction that user is looking and thereby determining where upon an electronic screen the user's gaze is falling at particular points in time. The systems are generally accurate and fast, allowing the location of the user's gaze to be tracked in real time as he or she scans an electronic display. For example, the gaze-tracking systems of the present art can enable a user to control a cursor on a computer screen based upon where on the screen he or she is looking at various points in time. Similarly, the gaze-tracking systems of the present art can be used to determine where a user is looking when reading an electronically displayed textual document. For example, the gaze-tracking systems of the present art can be used to determine in real-time, with minimal time delay and reasonable accuracy, which word a user is looking at when reading a textual document. Similarly, the gaze-tracking systems of the present art can be used to determine in real-time, with minimal time delay and reasonable accuracy, which line of text a user is looking at when reading a textual document.

For example, an eye tracking device has been developed by the IBM Corporation at its Almaden Research Center and is referred to by the acronym "MAGIC." This device is mounted proximate to a display screen, in a known positional relationship. When a user is viewing the screen, the IBM eye tracking device determines the point of gaze or focus, with respect to the screen, of the pupils of the user's eyes. This device generally comprises a camera which acquires successive image frames at a specified rate, such as 30 frames per second. The device further comprises two near infrared time multiplexed light sources, each composed of a set of IR light emitting diodes (LED's) synchronized with the camera frame rate. The system tracks eye focus by detecting the reflection of the emitted light off the user's eyes. More specifically, one light source is placed on or very close to the optical axis of the camera, and is synchronized with even frames. The second light source is positioned off of the camera axis, and is synchronized with the odd frames. The two light sources are calibrated to provide approximately equivalent whole-scene illumination. When the on-axis light source is operated to illuminate a reader's eye, which has a pupil and a cornea, the camera is able to detect the light reflected from the interior of the eye, and the acquired image of the pupil appears bright. On the other hand, illumination from off-axis light source generates a dark pupil image. Pupil detection is achieved by subtracting the dark pupil image from the bright pupil image. After thresholding the difference, the largest connected component is identified as the pupil.

Once the pupil has been detected, the location of the corneal reflection (the glint or point of light reflected from the surface of the cornea due to one of the light sources) is determined from the dark pupil image. A geometric computation is then performed, using such information together with a known positional relationship between the gaze-tracking sensor system and the electronic display. The computation provides an estimate of a reader's point of gaze in terms of coordinates on the electronic display.

The eye tracker device disclosed above is described in further detail in a paper entitled Manual and Gaze Input Cascaded (Magic), S. Zhai, C. Morimoto and S. Ihde, In Proc. CHI '99: ACM Conference on Human Factors in Computing Systems, pages 246-253. Pittsburgh, 1999. It should be appreciated that the gaze-tracking sensors described below are not limited to the eye-tracking device discussed above. It is anticipated that a wide variety of gaze-tracking sensor systems will readily occur to those of skill in the art for use in enabling the present invention. For example, gaze-tracking systems such as the ones disclosed in U.S. Patent Application Publication Nos. 2003/0038754, 2002/0180799, 2004/0075645, and 2005/0175218 may be used alone or in combination to enable the present invention.

FIG. 1 illustrates a gaze-tracking system according to at least one embodiment of the invention. As shown in the figure, a user 9 is sitting before an electronic display 3 which in this case is a computer monitor sitting upon a desk. The electronic display in this example is a desktop system, but those skilled in the art can envision how other electronic displays such as the displays associated with handheld devices including but not limited to e-books, PDAs, cell phone, wrist watches, portable media players, and portable gaming systems could be employed instead. Similarly, projectors, head mounted displays, and other non-screen based displays could be used.

As shown in FIG. 1, the electronic display 3 is driven by a personal computer 1 to display various documents upon the screen. At the instant shown, screen 11 represents a computer generated document that a user may manipulate and/or navigate using a cursor that is also displayed. In this example embodiment the cursor is controlled by mouse interface 7 that is connected to personal computer 1 and manipulated by user 9. The user may also manipulate and/or navigate the displayed document using keyboard 5 that is also connected to the personal computer. Using the keyboard 5 and mouse 7, the user may, for example, scroll through the document, switch between documents, switch between applications, open and close files, and/or otherwise control which documents, images, videos, web pages, and/or other content that is displayed upon the screen at any given time. Other user interfaces tools and methods such as voice recognition, gesture recognition, and gaze-responsive cursor manipulation, may also be used by the user to scroll through the document, switch between documents, switch between applications, open and close files, and/or otherwise control which documents, images, videos, web pages, and/or other content that is displayed upon the screen at any given time. In this way user 9 of this embodiment of the present invention may open a particular document with textual content and begin reading the text for a period of time. The user 9 may then shift his or her attention away from the textual document for a second period of time, either by looking away from the screen, looking to a different window, closing the document, scrolling to a different place in the document, opening a different window, opening a different application, shifting to a different window or application, and/or otherwise changing the on-screen or off-screen focus of his or her visual attention. The user 9 may then shift his attention back to the original document and resume reading where he or she left off. As is described throughout this document, the methods and apparatus of the present invention assist the user in resuming reading where he or she left off by displaying a graphical place-marker upon the textual document displayed upon screen 11 of display 3, the graphical place-marker indicating a location at or near the location where the user previously ceased reading and therefore will likely resume reading.

Also shown in FIG. 1 is a gaze-tracking system 8 that tracks the location of the user's gaze as he or she looks upon screen 11. The gaze-tracking system 8 may take many forms and is not restricted to any particular technology. As shown in FIG. 1, gaze tracking system 8 includes a camera mounted in a location such that it can capture an image of the user's eyes as he or she gazes upon screen 11. The gaze-tracking systems may also include one or more light sources that reflect light off portions of the user's eyes to assist in accurately and rapidly tracking the location of the user's eyes. The gaze-tracking system 8 includes software running upon computer 1 or may include gaze processing software running upon an embedded processor specific to the gaze tracking system itself. The gaze-tracking software may be stored on a CD-ROM 10 or other memory storage device inserted into the computer 1. Regardless of where the gaze processing software resides, it is operative to process the sensor signals detected by gaze-tracking system and produce coordinates and/or other indicia representing the location at which the user is looking upon the screen at various points in time. For example, in one common embodiment the gaze-tracking system and associated software produces screen coordinates at which the user is looking at any given moment, the screen coordinates being rapidly updated at a rate such as 60 times per second. In some embodiments of the present invention the gaze processing software is integrated into and/or communicates with system software such that the software produces references to on-screen elements that the user is currently looking at, the on-screen elements including indications of which windows, documents, menus, buttons, icons, characters, words, lines, paragraphs, images, web-pages, videos, and/or other displayed content elements that the user is then currently looking upon.

Figure 2:
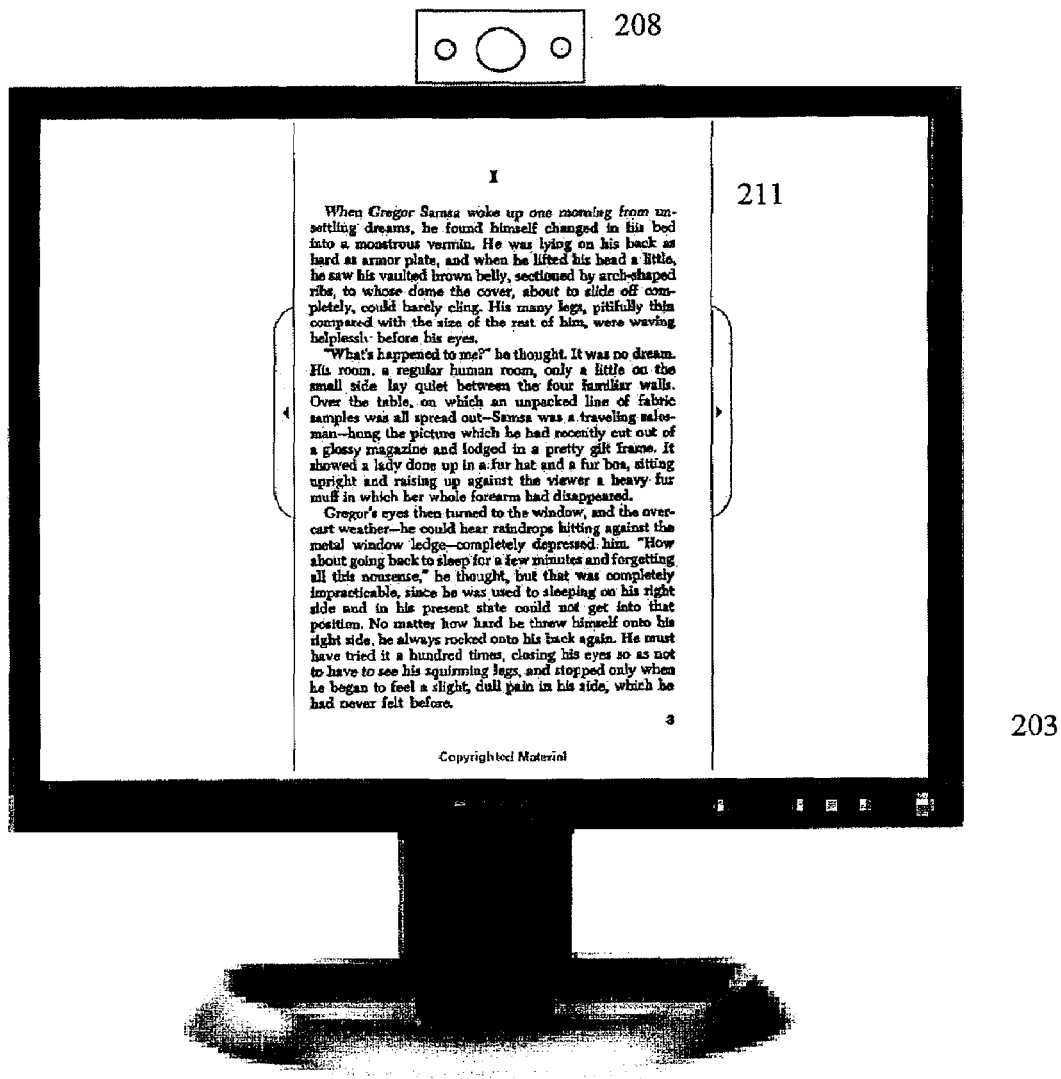
FIG. 2 illustrates a screen as might be viewed by a user who is reading a text document by electronic display according to at least one embodiment of the invention.

FIG. 2 illustrates a screen as might be viewed by a user who is reading a text document by electronic display according to at least one embodiment of the invention. The screen shown is a flat panel monitor 203 that is used equivalently with the traditional monitor shown in as element 3 in FIG. 1. Affixed to the flat panel monitor is a gaze-tracking system 208 that operates equivalently to the gaze-tracking system 8 in FIG. 1. The particular gaze tracking system shown as 208 includes a camera and two light sources. Other embodiments of gaze tracking systems may be used as described previously. Also shown in FIG. 2 is a textual document 211 displayed upon the screen for the user to view. In this case the textual document is an electronic book representation of Kafka's Metamorphosis. Shown in the figure is Chapter 1, page 1 of the book Metamorphosis. The user of this embodiment of the present invention, not shown in the figure, is seated facing the screen and reading to himself the lines of text beginning from the first few words "When Gregor Samsa woke up one morning." As he reads the text, his eyes trace across the words from left to right and then scan down a line when the end of each line is reached. As the user's eyes follow this reading motion, the gaze-tracking hardware and software routines determine in real time (with minimal time delay) where the user is looking. This data is generally stored in a buffer or other memory structure such that a time history of gaze location is stored and accessible by the routines of the present invention. The time history might be, for example, a representation of the last five seconds worth of gaze locations captured for the user.

The data buffering aside, the gaze-tracking hardware and software of embodiments of the present invention are operative to determine in real time (with minimal time delay) the current location where the user is looking as he or she reads the current textual document. Thus as the user looks at each word in the text in a traditional reading pattern, the gaze-tracking hardware and software routines determine the screen coordinates and/or the actual word in the text document where the user is looking. Because humans read in a highly predictable gaze-motion pattern, the gaze-tracking software routines have a context within which to predict and/or expect the gaze path to travel. This can be used to eliminate spurious data and/or erroneous data. For example a momentary erroneous data sample that does not fit the reading patterns can be ignored so long as data that precedes and follows the erroneous data sample matches the expected reading gaze-motion pattern of the user. On the other hand, if the gaze-tracking data suddenly jumps to a different location on the screen and does not immediately resume the expected reading gaze-motion patterns, the routines according to embodiments of the present invention are configured to determine that the user must have looked away from document and discontinued his reading. This might be because his or her gaze location jumped to a different location in the current document, jumped to a different location on the screen 203 that does not correspond with the current document at all, and/or jumped off the screen altogether to some other location in the physical world. Regardless of where the user's gaze location jumped, if it is determined that the user has ceased reading as described above, the routines of the present invention determine the last recorded gaze-location that corresponded with a screen location that corresponded with the expected reading pattern of the current document and determines that location to be the "last place" within the document. There are a number of ways in which the last place may be determined by processing the buffered gaze-tracking data for the user. Some of these embodiments will be described in more detail later in this document.

Once the "last place" within the document is determined by the routines of the present invention, the next step in the process is to display a graphical place marker at or near that last place location within the document. The graphical place marker may be a highlight, outline, underline, bold face print, or other accentuation of the text or area around the text corresponding to or near the last place location within the document. For example, if the user had read the text "When Gregor Samsa woke up one morning from un-settling dreams, he found himself changed in his bed into a monstrous vermin. He was lying on his back as hard as armor plate," and then suddenly looked away to answer a ringing telephone, the routines of embodiments according to the present invention would determine by processing the gaze-tracking data provided by the gaze-tracking system that the last place the user was looking while performing the characteristic reading gaze-motion prior to suddenly looking away, was at or near the word "plate" in the previous text string. In some embodiments of the present invention only the coordinates of the word plate within the document are determined. In other embodiments a text database is referenced as is done within a Microsoft Windows™ document such that the actual word is referenced based upon the gaze location. This process may be configured a little different technically than when a cursor location is used to identify and/or select a word within a text document, although in this case gaze location is used rather than mouse controlled cursor location. Regardless of which process is used, the word "plate" is identified and/or the location of the word "plate" within the document and/or upon the screen. This data is then used to display a graphical place marker at or near the word "plate" within the document. The graphical place marker may be a highlight, outline, underline, bold face print, increased font size, or other accentuation of the text or area around the text corresponding to or near the last place location within the document. For example the word "plate" might be highlighted in yellow such that it is easy to find when the user returns his or her visual attention to the current document. Alternately the word following "plate," which is "and" may be highlighted instead and/or in addition to the word plate. Alternately a number of words preceding the word "plate" and including the word "plate" might be highlighted, for example all the words preceding the word "plate" that are part of the same sentence or paragraph. Known herein as "pre-highlighting" this method of highlighting or otherwise accentuating a portion of text prior to the determined last-place location is often a preferred embodiment because users often need to re-read the preceding prior portion of the current sentence and/or preceding prior portion of the current paragraph to resume reading and regain the context of the language. These and other methods of generating an effective graphical place-marker will be described in more detail with respect to FIGS. 3 through 4.

The final step according to an embodiment of the present invention is the determination in some embodiments that the user, after looking away from the document for some period of time, has returned his gaze to the current document and resumed reading. This determination is performed based upon an analysis of the data from the gaze-tracking hardware and software, the routines of the present invention assessing based upon the data and the known location of the text strings on the page, if the user's gaze location has returned to a location at or near the documented "last place" location within the document. In some embodiments of the present invention this determination further includes an assessment if the user's gaze location then moves from the "last place" location forward along the lines of text on the page in a characteristic reading motion. In this case the user's gaze, upon resumed reading, would continue sequentially forward along the text—"and when he lifted his head a little, he saw his vaulted brown belly" at a speed within certain limits that are characteristic of reading.

Once it is determined that the user has returned his gaze to the last place location and/or has continued reading a number of words in the sequence immediately following the last-place location, the routines according to the present invention may be configured to remove the graphical place marker so that it no longer distracts the user and/or clutters the page.

In the event that the user looks away from the document again, now while at a different location in the text document, a new graphical place marker will be displayed at the new "last place" using the methods described above. This new place marker will be optionally removed when the user returns his gaze to the new last place location and/or continues reading a number of words in the sequence immediately following the new last place location. In some embodiments the user may take some other action, such as pressing a button or uttering a phrase to a speech recognition system, to cause the routines of the present invention to remove a currently displayed place marker. In this way the place marker may be automatically removed and/or may be removed in response to a specific user instruction to the interface of the computer system.

FIGS. 3A-3F illustrate enlarged portions of text displayed upon screen 211 according to at least one embodiment of the invention. Prior to moment in time captured by each of the images, the user had been reading sequentially through this portion of text in a characteristic reading manner. By characteristic reading manner it is meant that the user's eyes have been following sequentially through the text in with a gaze motion typical of reading. Upon reaching the word "which" on the sixth line of text from the top, the user suddenly looked away from that region of the screen. This might have been because an instant message popped up on a different area of the screen and the user shifted his attention to that instant message. This might have been because someone walked into the room and the user looked away from the screen to greet his or her visitor. This might have been because the telephone rang and the user looked away from the screen to answer.

Upon looking away from the text document, the user's characteristic reading motion is suddenly disrupted. The routines of the present invention detect the disruption in the characteristic reading motion based upon an analysis of the data reported by the gaze tracking system. For example, the gaze tracking system, which had been reporting data representing gaze locations moving over the displayed text, from word to word, in their expected sequential order, will suddenly report data that jumps to a location that is no longer consistent with the expected characteristic reading motion. In general this jump in the gaze tracking location is determined as a data value that is more than some distance threshold away from the expected location that follows sequentially in the text. In some embodiments a time threshold is also considered such that the data must remain more than some distance threshold away from the expected location for a certain threshold amount of time. The time threshold is useful in filtering out erroneous data and avoiding the system prematurely determining that a user has looked away when in fact it was a blink or a spurious motion. For example, a distance threshold and time threshold can be used as follows—a certain embodiment of the present invention may be configured to determine that the user has looked away from their current reading of a portion of a text document if the gaze tracking location data is determined to have a value that is more than 2.0 centimeters away from an expected location that is consistent with the sequential reading of text in a characteristic motion AND if the gaze tracking location data remains more than 2.0 centimeters way for more than 3 seconds. The specific choice of threshold values are generally dependent upon screen size, text size, line spacing size, and/or user preferences. In a preferred embodiment the system includes a configuration mode in which the use can set one or more configuration values that affect such thresholds.

The determination by the routines of the present invention that a user has disrupted his current reading of the text document by looking away from locations that are consistent with characteristic reading motion is referred to herein as a look-away determination. Upon determining that a look-away occurred, the routines of the present invention store the last gaze location captured by the gaze-tracking system that corresponded with a location on the text document that was consistent with the expected characteristic reading motion. This location is at or substantially near the last place the user was looking while reading the document, prior to looking away, and is therefore referred to herein as the "last place location." This last place location is then correlated with the textual document such that is corresponds with a word or words in the textual document that the user has read prior to looking away. Thus the last place location may be specific screen coordinate(s) and/or a specific string of text within the textual document. In the present example, the user had just read the word "which" prior to looking away and thus the last place location is determined to be the absolute or relative screen coordinates of "which" and/or the specific string of text within the textual document corresponding with the word "which." Either way what is stored as the "last place location" is information sufficient to enable the graphical display routines of the present invention to accentuate that location within the textual document with a graphical place marker.

There are many ways in which the accentuation may be performed by the methods and apparatus of the present invention. In the particular example shown in FIG. 3A, the last-place location was correlated with the nearest whole word in the text document. This word was "which" which was then accentuated by the display routines of the present invention. The area to be highlighted is roughly shown by the combination of the box with the diagonal lines through the word "which." In this particular embodiment the word "which" was accentuated by overlaying a semi-transparent region of yellow over the black text of the word "which" thereby giving it the impression that it was highlighted with a physical highlighter. For the purposes of embodiments disclosed herein with respect to FIGS. 3A-3F, the highlighting of the text is represented with a combination of the box with diagonal lines through the text, which in this case is the word "which."

This method of highlighting text is well known in the art and is familiar to users as a means of accentuating an area of text. Thus FIG. 3A depicts the textual document with a highlighting that represents a last-place location corresponding with the word "which". The user upon returning his or her attention to the document can thus easily find his lost place because it is clearly accentuated. Note—other methods can be used to accentuate the word "which" in this example, including but not limited to underlining the word, bolding the font of the word, magnifying the word, or otherwise visually drawing attention to the word with added graphical content.

Referring next to FIG. 3B, an alternate example is depicted for accentuating the last place location of the user. In this example, what is visually accentuated is not the last word read by the user, but the next word to be read by the user. Thus in this embodiment of the present invention, the routines that generate the graphical place marker determine the string of text (i.e., the word) that comes after (in sequence) the last word the user read prior to looking away. In this particular example, the last word the user read was "which" and thus the next word in sequential order is "an." Thus in this embodiment of the present invention the word "an" is highlighted as the graphical place marker. In this particular embodiment the word "an" was accentuated by overlaying a semi-transparent region of yellow over the black text of the word "an" thereby giving it the impression that it was highlighted with a physical highlighter. This method of highlighting text is well known in the art and is familiar to users as a means of accentuating an area of text. Other methods can be used to accentuate the word "which" in this example, including but not limited to underlining the word, bolding the font of the word, magnifying the word, or otherwise visually drawing attention to the word with added graphical content.

Referring next to FIG. 3C, an alternate example is depicted for accentuating the last place location of the user. In this example, what is visually accentuated is not only the last word read by the user, but a portion last sentence read by the user beginning from the first word in that sentence and ending with the last word to be read by the user. Thus as shown in this example, the portion of the sentence beginning with the first word "Over" and ending with the last word read by the user "which" is highlighted. This is a very useful embodiment of the present invention because quite often a user who is returning to a document that he or she previously ceased reading does not want to continue reading from the last word he or she just read but instead wants to re-read the whole sentence that was disrupted. This is because many users desire to re-gain the sentence context before continuing on into unread text. Thus this embodiment of the present invention not only shows the user the specific word (or location) at which he or she left off at, this embodiment directs the user to the start of the last sentence he or she had been reading and thus facilitates the user in re-reading that sentence before continuing on. In this particular embodiment, the sentence portion "Over the table, on which" was accentuated by overlaying a semi-transparent region of yellow graphical imagery over the text of that portion of the sentence thereby giving it the impression that it was highlighted with a physical highlighter. This method of highlighting text is well known in the art and is familiar to users as a means of accentuating an area of text. Other methods can be used to accentuate the portion of the sentence in this example, including but not limited to underlining the sentence portion, bolding the font of the sentence portion, magnifying the sentence portion, or otherwise visually drawing attention to the sentence with added graphical content.

Referring next to FIG. 3D, an alternate example is depicted for accentuating the last place location of the user. In this example, what is accentuated is not only the last word read by the user, but a portion last paragraph read by the user beginning from the first word in that paragraph and ending with the last word to be read by the user. Thus as shown in this example, the portion of the paragraph beginning with the first word "What's" and ending with the last word read by the user "which" is highlighted. This is a very useful embodiment of the present invention because quite often a user who is returning to a document that he or she previously ceased reading does not want to continue reading from the last word he or she just read but instead wants to re-read the whole paragraph that was disrupted to re-gain general context before continuing on into unread text. Thus this embodiment of the present invention not only shows the user the specific word (or location) at which he or she left off at, this embodiment directs the user to the start of the last paragraph he or she had been reading and thus facilitates the user in re-reading that paragraph before continuing on. In this particular embodiment, the paragraph portion was accentuated by overlaying a semi-transparent region of yellow graphical imagery over the text of that portion of the paragraph thereby giving it the impression that it was highlighted with a physical highlighter. This method of highlighting text is well known in the art and is familiar to users as a means of accentuating an area of text. Other methods can be used to accentuate the portion of the paragraph in this example, including but not limited to underlining the paragraph portion, bolding the font of the paragraph portion, outlining the paragraph portion, magnifying the paragraph portion, or otherwise visually drawing attention to the paragraph with added graphical content.

Referring next to FIG. 3E, an alternate example is depicted for accentuating the last place location of the user. In this example, what is accentuated is the entire paragraph that the user was in the midst of reading when the look-away occurred. This is achieved in this example by highlighting the entire paragraph with a semi-transparent region of yellow graphical imagery overlaid over the text of that portion of the paragraph thereby giving it the impression that it was highlighted with a physical highlighter. This method of highlighting text is well known in the art and is familiar to users as a means of accentuating an area of text. In addition, the last word the user read is also accentuated by the presentation of an graphical underline. In this way two different accentuation means are used, one to draw the user's attention to the entire paragraph that he or she was reading and a second one to inform the user where within that paragraph the user had reached prior to the look away. Such a dual accentuation method, one to highlight a full or partial paragraph, and one to identify the last place location or corresponding last place word, is highly desirable to users for it provides them with visual cues by which they can find the beginning of the paragraph that had been interrupted as well as find the specific location in the paragraph where the interruption had occurred. This provides the user with options as to how he or she desires to resume reading. Other methods can be used to accentuate either or both of the paragraph portion and/or the last place location (or word) within the paragraph in this example, including but not limited to underlining, bolding the font, outlining, magnifying, or otherwise visually drawing attention to the particular paragraph, word, or location with added graphical content.

Referring next to FIG. 3F, an alternate example is depicted for accentuating the last place location of the user. In this example, what is accentuated is a portion last paragraph read by the user beginning from the first word in that paragraph, extending past the last word read by the user, and ending the completion of that that line of text on which that last word resides. Thus as shown in this example, the portion of the paragraph beginning with the first word "What's" and ending with the last word read by the user "fabric" is highlighted. This is achieved in this example by highlighting a rectangular region of the paragraph shown with semi-transparent yellow graphical imagery. In addition, the last place location is also accentuated by the presentation of an graphical flag that indicates the location between the last word read by the user and the next word to be read by the user. This graphical flag may be shown as a vertical line in the space between the last word read and the next word to be read. In this particular figure the graphical flag also includes a triangular flag graphic to help draw a user's attention to it. Many different images may be used to similarly draw a user's attention to the last place location. Thus in this example embodiment, two different accentuation means are used, one to draw the user's attention to a portion of the paragraph that he or she was reading and a second one to inform the user where within that paragraph the user had reached prior to the look away. Such a dual accentuation method, one to highlight a partial paragraph, and one to identify the last place location, is highly desirable to users for it provides them with visual cues by which they can find the beginning of the paragraph that had been interrupted as well as find the specific location in the paragraph where the interruption had occurred. Other methods can be used to accentuate either or both of the paragraph portion and/or the last place location within the paragraph in this example, including but not limited to underlining, bolding, outlining, or magnifying.

Figure 4:
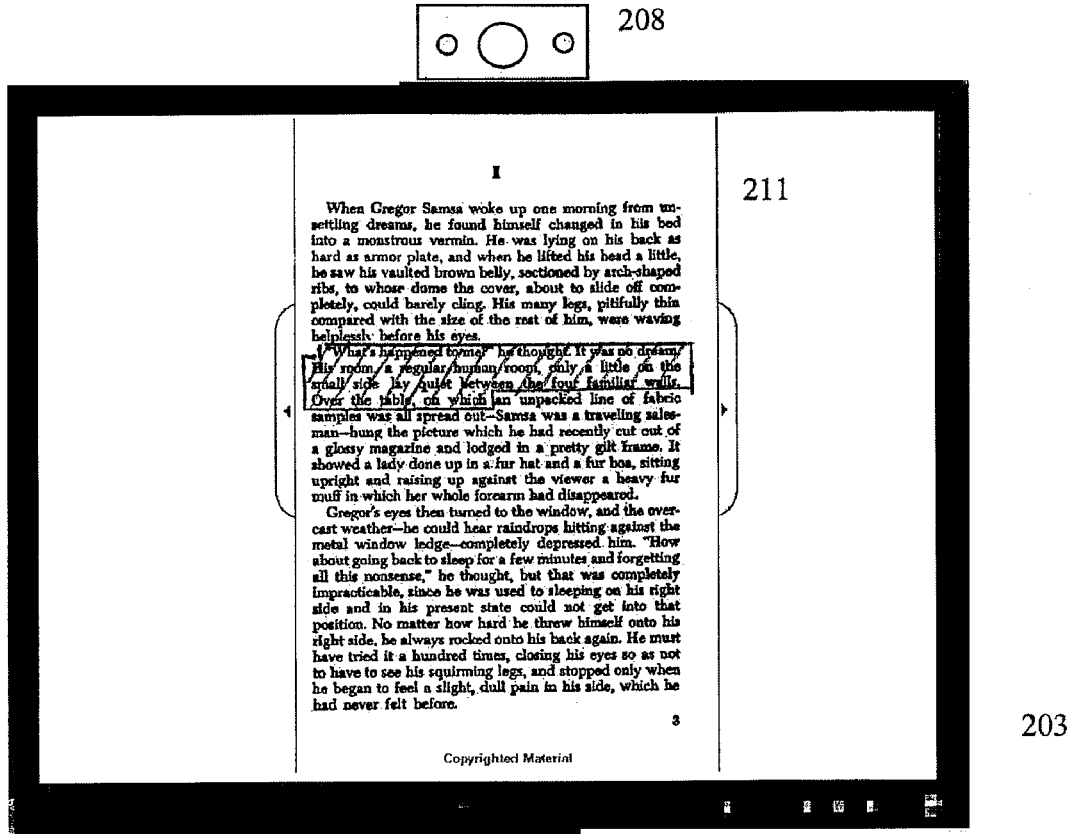
FIG. 4 illustrates a full screen image is shown corresponding to the accentuation embodiment shown as a close-up in FIG. 3D according to at least one embodiment of the invention.

FIG. 4 illustrates a full screen image is shown corresponding to the accentuation embodiment shown as a close-up in FIG. 3D according to at least one embodiment of the invention. In this full screen view it becomes more apparent how the highlighting method of the present invention can help a user find his last place location and/or find the beginning of his last paragraph within a full page of text that otherwise may have taken time to visually parse. Thus the methods and apparatus of the present invention are beneficial in saving time, effort, attention, of the user in finding his or her last place location. Also, as mentioned previously, the methods of the present invention can be configured to automatically remove the displayed accentuation when it is determined that the user has returned his gaze to the text and has continued reading. In many embodiments the removal of the displayed accentuation is performed when the resumed eye-gaze location returns to (or near) the last-place location and continues forward in a characteristic reading motion. Thus the accentuation is automatically removed by the routines of the present invention when it is likely no longer needed by the user.

As to the specifics of the accentuation removal, it may be abruptly performed by a simple graphical display routine that, for example, suddenly ceases to display the highlighting region and/or underline, or suddenly returns any bolded or magnified text back to normal. In one highly desirable embodiment of the present invention the accentuation removal is performed using a faded removal method in which the accentuation is gradually removed over a period of time such that an abrupt transition is not apparent to the user. By avoiding an abrupt transition it is less likely that the accentuation removal will distract the user who is then reading forward in the text. In one embodiment of a faded removal method the accentuation is gradually removed such that the text returns to normal display over a period of transition time equal to five seconds. Thus over a five second period, for example, the highlighted area slowly fades and disappears. This can be performed in software by gradually increasing the translucency parameter for the yellow highlight region until it is entirely transparent thus no longer present at all in the display, the gradual increasing of the translucency occurring over the five second time period in regular rapid intervals. Thus to the user it appears that the highlighted region slowly fades away and disappears. Similar methods are used for gradually fading out underlines, bold text, graphical flags, and other graphical place marker imagery.

In some embodiments of a present invention, a graphical place marker can be configured to time-out after a certain period of time has elapsed during which time the user is performing some other task. For example, if a user returns to the particular document in which the graphical place marker is displayed and reads some other portion of the text for more than some certain period of time, the routines of the present invention can be configured to remove the place marker for it is likely after that certain period of time that the user has no intention of returning to marked location in the text. A variety of different time-out conditions and time thresholds can be set by the methods and apparatus of the present invention and in some embodiments are user configurable through setup menus and the like.

In many situations, a user may be engaged in a process of reading multiple documents, switching back and forth for example, while search for information about a particular topic and/or comparing the information within the multiple documents. In such cases, the user may which to find his last place location within each of the multiple documents upon to returning to that particular one. Thus in many embodiments of the present invention a last place location is stored in memory for each of a plurality of different documents that may be displayed to the user at different moments in time. Similarly in many embodiments of the present invention a graphic place marker may be derived and displayed upon the text for each of a plurality of different documents that user may be switching back and forth between. In this way the user can more easily find his last place when engaging in such document switching. Similarly, in some embodiments multiple place markers may be generated within a single document as a user's reading jumps to different portions of that document. In this way a user may jump around a document and more easily return to each last place location within a read segment of text.

In some embodiments of the present invention, an alternate method is used in which the current line of text that the user is reading (as determined by his gaze tracking location) is highlighted continuously as the user reads through the textual document, each subsequent line being highlighted as the user reaches it. Such embodiments are referred to herein as line-tracking methods. Upon looking away the highlighted line of text simply remains until the user returns his gaze to the document and continues reading, at which point it again is displayed at the then current line of the user. In some embodiments the highlighted line may be removed after a time-out as described above. This alternate method does not offer all the benefits of the other methods described above and for some users may be too obtrusive because the accentuation is always present, but it is computationally simpler for a look-away location need not be determined. Instead the routines of the present invention must only track a user's current gaze location and display the graphical accentuation upon the current line within the text that the user is reading. As the user reaches a next line in the text, the accentuation is moved to that line of text. In this way a simpler use of eye-tracking data can achieve some of the benefits described herein. These benefits are achieved because the accentuated line of text remains after a look away and thus assists the user when returning to the document in finding at least the line within the test that the user had been reading. Note—this method is made more robust by using additional computational techniques as described previously. For example, the method by which it is determined that a user has progressed from one line to the next is made most robust by assessing the gaze-tracking data and determining that the user has progressed to the next line of text by progressing through the sequential text strings in a characteristic reading motion. In this way if a user simply looks to another portion of the text (his or her eyes jumping to that location in an abrupt and non-characteristic reading motion), the routines of the present invention can determine that the accentuated line of text should NOT be updated but should remain at the previous line of text until it is determined that the user has resumed a characteristic reading motion over the strings of text again. In this way the user can read through a document, have the highlighted line of text follow his characteristic progression through the text, and not mistakenly following him or her if he or she glances to other locations within the text without reading.

It should be noted that the line-tracking methods of the present invention may be used in combination with the other methods described herein. For example a line-tracking method may be used in combination with methods described herein for placing an additional graphical place marker at the specific look-away location determined by the analysis of the gaze-tracking system. Similarly, the line-tracking method can be combined with the sentence highlighting and/or paragraph highlighting methods described herein. For example, as the user reads through the text the line-tracking methods can be used to continually highlight the current line of text that the user is reading. Upon looking away, a portion of the last paragraph or last sentence that the user was reading may also be highlighted to help the user re-gain textual context by re-reading that portion of the text as described previously.

FIGS. 5A-5C illustrate example screens of a line-tracking method according to at least one embodiment of the invention. Referring to FIG. 5A, shown is an example screen from a line-tracking method of the present invention. As the user reads through the text, the current line on which his gaze is falling is highlighted with a yellow highlighting region. In this example, the user is currently reading the word "which." That entire line is highlighted as the user reads that word and as the user progresses forward along that line. If the user looks away from the document and/or glances to another portion of the document in a non-characteristic reading motion, the highlighting of this line of text will remain, thereby serving as a graphical place marker to assist the user in resuming his or her reading. Other methods can be used to accentuate the current line of text, including but not limited to underlining, bolding, outlining, or magnifying that line of text.

Referring to FIG. 5B, shown is an example screen from a line-tracking method that also employs a paragraph-portion highlighting method upon a determined look-away. As shown herein, the use has looked away from the text while reading the word "which". Thus upon look-away, a portion last paragraph read by the user beginning from the first word in that paragraph, extending past the last word read by the user, and ending the completion of that that line of text on which that last word resides, is highlighted. Thus as shown in this example, the portion of the paragraph beginning with the first word "What's" and ending with the last word read by the user "fabric" is highlighted. This is achieved in this example by highlighting a rectangular region of the paragraph shown with semi-transparent yellow graphical imagery. When the user returns his gaze to the document and reaches the last word that has previously been read, the additional accentuation is removed (abruptly or through the fading method described previously) and what is left is the highlighting of the current line on which the user is reading. As the user continues, the line-tracking method continues functioning as described previously until the next look away. Thus when the user continues reading from the word "which" and reaches the next line of text in the document, that line of text is highlighted as shown in FIG. 5C.

Note, some users may derive additional benefit from the line-tracking methods disclosed herein, separate and apart from the graphical place marker methods, for such users may simply enjoy having the current line of text they are reading highlighted and/or otherwise accentuated as they progress through the document. It should also be noted that a word-tracking method may be employed analogously to the line-tracking methods described herein wherein the current word that a user is looking at is continuously highlighted as the user progresses through the text in a characteristic reading motion. Again, such word tracking methods may be used in combination with the automatic graphical place marker techniques described herein.

Thus far the placement and display graphical place markers as described herein have been automatically controlled by the methods and apparatus and software routines described herein. That said, in some embodiments of the present invention the user may also be given the ability to purposely place a graphical place marker upon a textual document at a location that he or she is currently looking. For example, by pressing a button, uttering a verbal command to a voice recognition system, issuing a gesture to a gesture recognition system, or performing a purposeful and characteristic blink that is recognized by the gaze-tracking system, the user may command the system of some embodiments of the present invention to place a graphical place marker at the location within the text that he or she is currently looking. Similarly, the user may look at a location within the text and have the system perform the word highlighting, sentence highlighting, paragraph highlighting, or line highlighting features described herein based upon the aforementioned deliberate user command. Upon returning to the text and reading past the specified location, the graphical place marker may be automatically removed using the methods previously described herein.

Although the description provided herein refers sometimes to screen of traditional computer systems, the present invention is applicable to a wide range of display environments on which users read textual documents. These include but are not limited to personal computers, set top boxes, personal digital assistances, cellular phones, portable media players, portable gaming systems, and other portable and stationary systems that display text using a computational processor. In addition, although the description provided herein refers sometimes to traditional screens, the present invention is applicable to a wide range of display technologies including screens, projected images, electronic paper, and other display technologies. Thus the word screen as used herein is generally referring to any technology through which an image is displayed to a user such that a user looks upon a surface or area and reads text by moving his or her eyes across the textual display region. As an example alternate embodiment, FIG. 6 depicts an electronic book embodiment of the present invention.

As disclosed in U.S. Pat. No. 6,493,734, entitled "System and method to efficiently generate and switch page display views on a portable electronic book," which is hereby incorporated by reference, an electronic book is a device that receives and displays documents, publications, or other reading materials downloaded from an information network. An electronic book can also be a device that receives and displays documents, publication, and/or other reading materials accessed from a data storage device such as a CD, flash memory, or other permanent and/or temporary memory storage medium. In a common embodiment, users of an electronic book can read downloaded contents of documents, publications, or reading materials subscribed from a participating bookstore at his or her own convenience without the need to purchase printed version. When reading the documents, publications, or reading materials, users of an electronic book can advance pages forward or backward, jump to any particular page, navigate a table of contents, and/or scale the pages of the reading materials up or down depending on the users' preferences.

Figure 6:
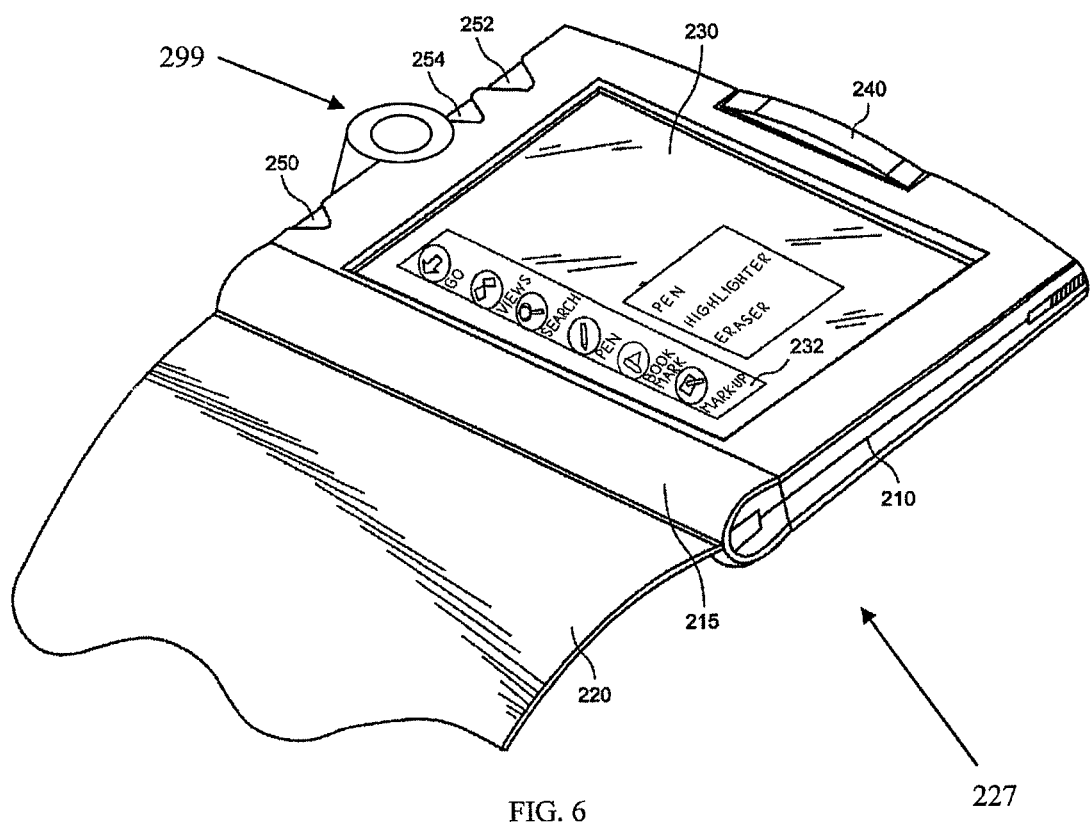
FIG. 6 illustrates an electronic book according to at least one embodiment of the invention.

FIG. 6 illustrates an electronic book 227 according to at least one embodiment of the invention. The electronic book 227 includes a housing 210, a battery holder 215, a cover 220, a display screen 230, a page turning interface device 240, a menu key 250, a bookshelf key 252, and a functional key 254. The housing 210 provides overall housing structure for the electronic book. This includes the housing for the electronic subsystems, circuits, and components of the overall system. The electronic book is intended for portable use; therefore, the power supply is mainly from batteries. The battery holder 215 is attached to the housing 210 at the spine of the electronic book 227. Other power sources such as AC power can also be derived from interface circuits located in the battery holder 215. The cover 220 is used to protect the viewing area 230.

The display screen 230 provides a viewing area for the user to view the electronic reading materials retrieved from the storage devices or downloaded from the communication network. The display screen 230 may be sufficiently lit so that the user can read without the aid of other light sources. When the electronic book is in use, the user interacts with the electronic book via a soft menu 232. The soft menu 232 displays icons allowing the user to select functions. Examples of these functional icons include go, views, search, pens, bookmarks, markups, and close The page turning mechanism 240 provides a means to turn the page either backward or forward. The page turning mechanism 240 may be implemented by a mechanical element with a rotary action. When the element is rotated in one direction, the electronic book will turn the pages in one direction. When the element is turned in the opposite direction, the electronic book will also turn in the opposite direction.

Also shown in FIG. 6 is a gaze-tracking system 299 integrated within the housing of electronic book and operative to track the gaze location of the user as he or she reads text upon the electronic book. Gaze tracking system 299 includes one or more cameras and/or other sensors for tracking the gaze location of the user's eyes. The software routines as described herein for performing one or more of the automatic graphical place marker features of the present invention are stored in memory on board the electronic book and are run upon a processor of the electronic book. In addition the software routines described herein for performing one or more of the line-tracking and/or word-tracking features of the present invention are generally stored in memory on board the electronic book and are run upon a processor of the electronic book. Thus in this way the electronic book embodiment shown herein may be configured analogously to the desktop embodiments described elsewhere within this document. And although the ebook example shown herein employs a screen for displaying text, it is envisioned that future embodiments of electronic books will employ electronic paper and other new display technologies that may be employed within the systems of the present invention.

Figure 7:
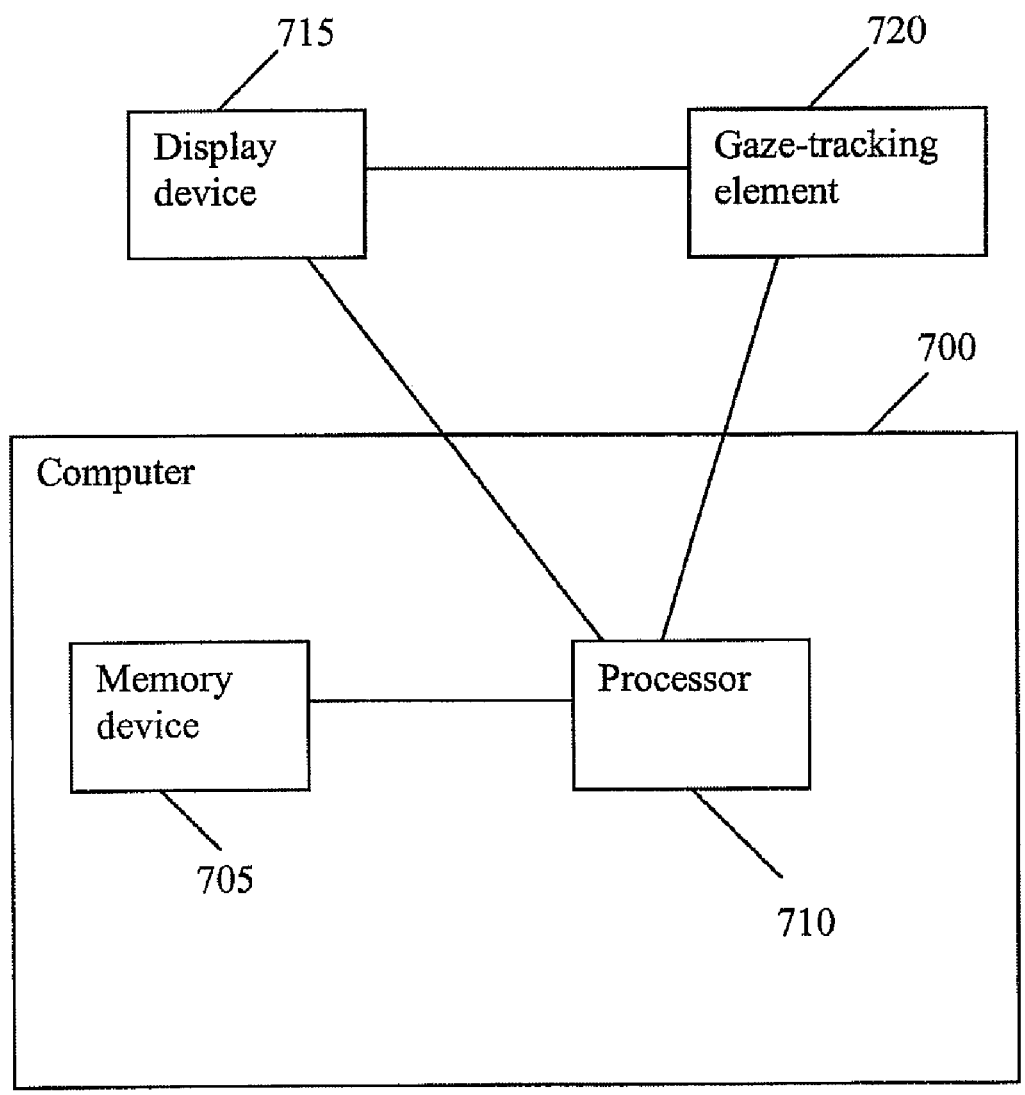
FIG. 7 illustrates a computer according to at least one embodiment of the invention.

FIG. 7 illustrates a computer 700 according to at least one embodiment of the invention. As shown, the computer 700 includes a memory device 705 and a processor 710. The memory device 705 may include program code to be executed by the processor 710. The processor 710 is also in communication with a display device 715 for displaying the textual document to be highlighted as described above. A gaze-tracking element 720 is adapted to determined whether the user's gaze falls on the displayed textual document.

This invention has been described in detail with reference to various embodiments. It should be appreciated that the specific embodiments described are merely illustrative of the principles underlying the inventive concept. It is therefore contemplated that various modifications of the disclosed embodiments will, without departing from the spirit and scope of the invention, be apparent to persons of ordinary skill in the art.

While the invention herein disclosed has been described by means of specific embodiments and applications thereof, numerous modifications and variations could be made thereto by those skilled in the art without departing from the scope of the invention set forth in the claims.

What is claimed is:

1. A method for automatically providing reading place markers to a user, comprising:
    tracking a location of a user's gaze upon a textual document displayed on a display device, the tracking being performed as the user reads a portion of text within the textual document;
    performing a look-away determination with respect to the portion of text currently being read by the user, the look away determination indicating that the user's gaze has ceased moving upon the portion of text in a characteristic sequential reading manner and has moved away from an expected reading location;
    automatically accentuating an area of the portion of text based upon the location of the user's gaze prior to a determined look-away event; and
    removing the accentuation in response to the user's gaze returning to the portion of text within the textual document.

2. The method of claim 1, wherein the look-away determination indicates that the user has ceased reading the portion of text based at least in part upon the user's gaze leaving the portion of text for more than a threshold amount of time.

3. The method of claim 1, wherein the look-away determination indicates that the user has ceased reading the portion of text based at least in part upon the user's gaze having moved from the portion of text by more than a threshold distance.

4. The method of claim 1, wherein the area that is automatically accentuated includes a last word determined to have been read by the user prior to the determined look-away event.

5. The method of claim 4, wherein the area that is automatically accentuated includes a next sequential word after the last word determined to have been read by the user prior to the determined look-away event.

6. The method of claim 1, wherein the area that is automatically accentuated includes a portion of a last sentence determined to have been read by the user prior to the determined look-away event.

7. The method of claim 6, wherein the accentuated area of the portion of the last sentence extends at least from the start of the last sentence to a word prior to the last word determined to have been read by the user prior to the determined look-away event.

8. The method of claim 1, wherein the area that is automatically accentuated includes a portion of the last paragraph determined to have been read by the user prior to the determined look-away event.

9. The method of claim 1, wherein the removing the accentuation is performed in response to the user's gaze returning to the portion of text for more than a threshold amount of time.

10. The method of claim 1, wherein the removing the accentuation is performed in response to a determination that the user's gaze has resumed moving upon the portion of the text in a characteristic sequential reading manner.

11. The method of claim 1, wherein the removing the accentuation is performed gradually over a period of time.

12. The method of claim 1, wherein the accentuation includes causing a color change of at least one of the text and a region around the text.

13. The method of claim 1, wherein the accentuation includes underlining the text.

14. A system for automatically providing reading place markers to a user, comprising:
    a display device to display a textual document to the user;
    a gaze-tracing element to monitor a location of a user's gaze upon said textual document;
    at least one processor to:
        perform a look-away determination with respect to a portion of text currently being read by the user, the look away determination indicating that the user's gaze has moved away from the portion of text currently being read; and
        automatically accentuating an area of the portion of text based upon the look-away determination.

15. The system of claim 14, wherein the look-away determination is based at least in part upon the user's gaze leaving the portion of text currently being read by the user for more than a threshold amount of time.

16. The system of claim 14, wherein the look-away determination is based at least in part upon the user's gaze having moved from the portion of text currently being read by the user by more than a threshold distance.

17. The system of claim 14, wherein the area that is automatically accentuated includes the last word determined to have been read by the user prior to the determined look-away.

18. The system of claim 14, wherein the accentuation of the area of the portion of text is automatically removed by the processor in response to the user's gaze returning to the portion of text within the textual document.

19. The system of claim 18, wherein the removing of the accentuation of the area of the portion of text is performed in response to the user's gaze returning to the portion of text for more than a threshold amount of time.

20. The system of claim 14, wherein the area that is automatically accentuated includes at least a substantial portion of the last sentence determined to have been read by the user prior to a determined look-away event.

21. The system of claim 14, wherein the removing of the accentuation is performed gradually over a period of time.

22. A method for automatically providing reading placemarkers to a user, comprising:

tracking a location of a user's gaze upon a textual document displayed on a display device, the tracking performed as the user reads a portion of text within the textual document;

performing a look-away determination with respect to the portion of text currently being read by the user, the look away determination indicating that the user's gaze has moved away from the portion of text currently being read by the user; and automatically accentuating an area of the portion of text in response to the look-away determination.

23. The method of claim 22, further including removing the accentuation in response to the user's gaze returning to the portion of text within the textual document.

24. The method of claim 23, wherein the removing of the accentuation is performed in response to the user's gaze returning to the portion of text for more than a threshold amount of time.

25. The method of claim 23, wherein the removing of the accentuation is performed in response to a determination that the user's gaze has moved upon the portion of text in a characteristic reading manner.

* * * * *